United States Patent
Glatzel

[11] 3,910,684
[45] Oct. 7, 1975

[54] MIRROR-LENS OBJECTIVE

[75] Inventor: Erhard Glatzel, Heidenheim, Germany

[73] Assignee: Carl Zeiss-Stiftung, Oberkochen, Germany

[22] Filed: Sept. 16, 1974

[21] Appl. No.: 506,521

[30] Foreign Application Priority Data
Oct. 6, 1973  Germany............................ 2350281

[52] U.S. Cl.................................. 350/199; 350/201
[51] Int. Cl.²................................. G02B 17/08
[58] Field of Search............................ 350/199, 201

[56] References Cited
UNITED STATES PATENTS
2,742,817  4/1956  Altman ................. 350/199
3,115,537  12/1963  Bird ...................... 350/199

Primary Examiner—John K. Corbin
Attorney, Agent, or Firm—Stonebraker, Shepard & Stephens

[57] ABSTRACT

A mirror-lens system or objective, bounded at one end by a concave collecting mirror or reflective surface, concave toward the opposite end of the system; a rear lens member having at least one lens element located ahead or in front of the mirror; and a front lens member having at least two lens elements forming the front of the system and air spaced forwardly from the rear member. One of the elements of the front member is a negative lens designed to produce overcorrection of aberrations. Rules are developed which, if followed, will result in a system producing a very high grade image having reduced aberrations of higher order. Constructional data are given for several specific examples or embodiments of the invention.

25 Claims, 10 Drawing Figures

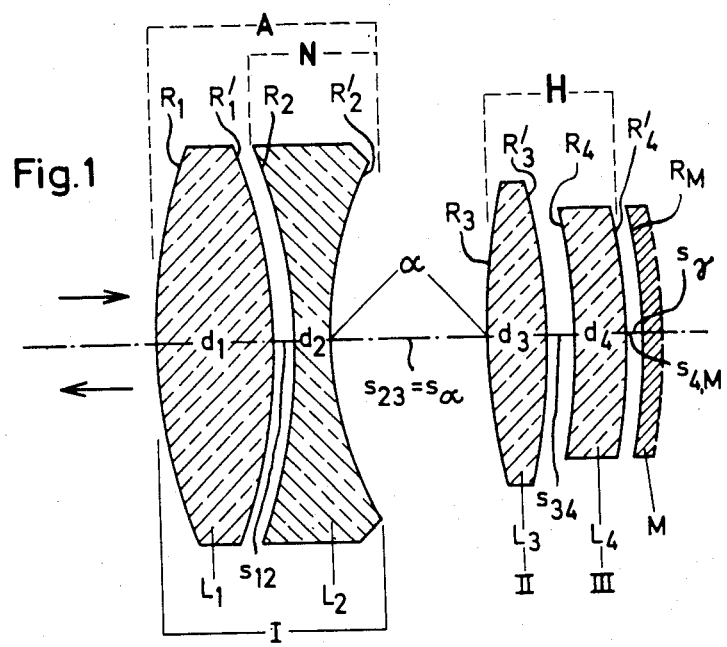
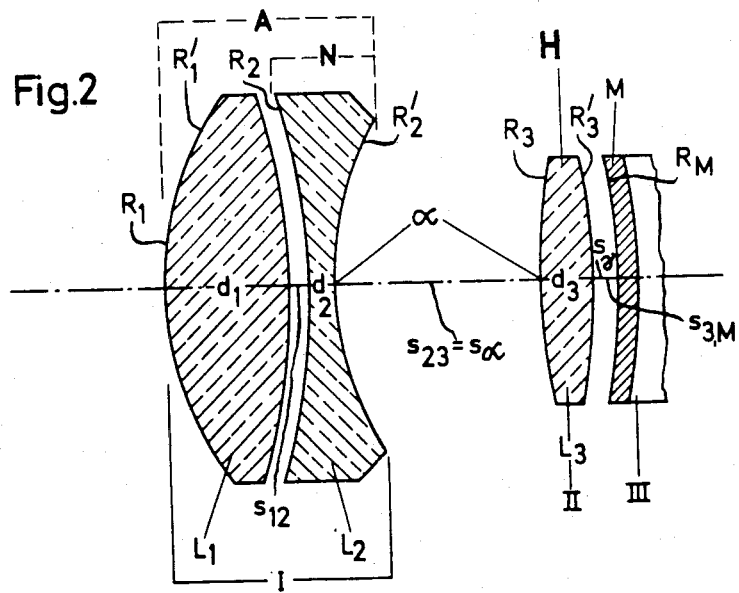

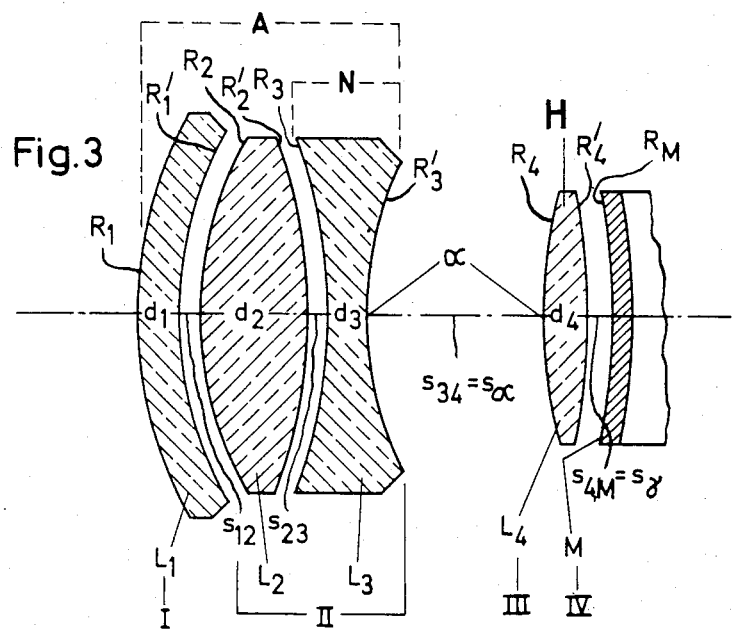
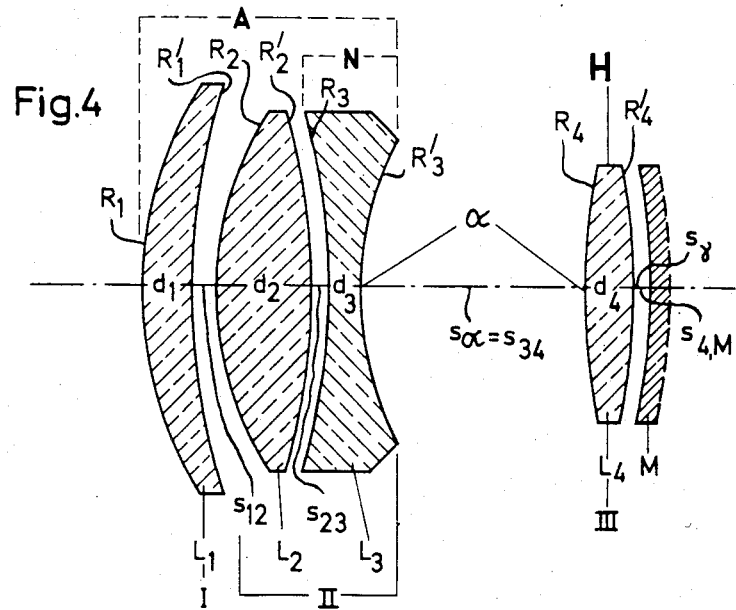

MIRROR-LENS OBJECTIVE

BACKGROUND OF THE INVENTION

This invention relates to an optical system of the kind having a mirror or reflecting surface, as well as a plurality of lens elements having refractive power. Various forms of such optical systems are known in the art. They are sometimes called mirror-lens systems or objectives, and are sometimes designated broadly by the term "mirror optics." They are used for various purposes, such as optical systems or objectives for cameras, projectors, telescopes, or other optical instruments.

The incoming light rays from the object or subject travel from the front of the system through the various lens elements to the reflecting surface or mirror. From the mirror, the rays travel forwardly again through the same lens elements, to form the desired image. Thus both the object and image lie on the same side of the reflecting surface. This combined object-image side may be described as the front or forward side of the mirror and of the entire system. The object rays entering the system at the front and image rays leaving the system from the front in the direction opposite to the entering object rays, may be separated from each other to the extent necessary by any suitable conventional separation system known in the art, not constituting part of the present invention and not here described.

From what has been said above, it is apparent that each ray of light is subjected twice to the refractive influence of each lens element, once as the ray enters the system travelling toward the mirror, and again as the ray travels forwardly from the mirror after reflection thereby.

SUMMARY OF THE INVENTION

The present invention relates to a mirror-lens objective system of the general type above described, and more specifically to such a system in which the lens elements are so arranged that they form, a rear member or inner member (H) containing at least one lens element, and in front of this, air spaced from the rear member H, a front member or forward member (A) having at least two lens elements, one of such elements (N) of the front member A being a lens of negative power. In each case, according to the present invention, the mirror is concave toward the front, having collective power, as distinguished from a plane or flat mirror. It is within the scope of the invention to have the mirror reflective surface carried by the rear surface of the inner or rear member H, or to have it on a separate carrier separate from the rear member H. Both arrangements are included in the specific examples which follow.

The air space between the inner or rear member H and the outer or front member A may contain a filter, which may be either a flat or plane filter member, or a curved filter member, the latter being sometimes advantageous in overcoming or reducing some of the reflection difficulties that sometimes occur with a flat filter. The specific examples which follow include embodiments with both types of filter, as well as other embodiments having no filter in the air space between the inner member H and the outer member A.

According to the invention, certain rules or conditions have been developed and determined, regarding the relationship to each other of the mirror, the rear or inner member H, the front or outer member A, and the negative element N of the front member. If all of these rules or conditions herein stated are followed in designing a mirror-lens system of the type here dealt with, it is found that superior results are achieved. These rules stated below constitute new principles of construction by which it is possible for a designer skilled in the art and following these new rules here enunciated, to reduce substantially the aberrations of higher order in the central as well as in the abaxial visual field, making it possible to equip mirror-lens systems of average relative aperture with a definite enlargement of the angular field of view if desired, or else, if no enlargement of the field of view is wanted, to provide a particularly fine sharpness of the image at a higher relative aperture than is otherwise possible.

The provision of a wider angular visual field of view as compared with the field previously possible with the same sharpness of image, offers the important possibility of industrial production of systems which will sharply cover existing image-field formats with particularly short system focal lengths. The new wide-angle mirror-lens objectives according to the present invention thus obtain a compactness of construction (overall dimensions) previously considered unattainable.

The rules or conditions which, according to the present invention, will result in the improved performance, may be stated as follows.

Rule 1 or $a$: The sign of the focal length of the inner or rear member H is in all cases positive rather than negative.

Rule 2 or $b$: The quotient of the paraxial focal length ($f_H$) of the inner member H divided by the paraxial focal length ($f_M$) of the concave mirror or reflecting surface M is within the range or limits of +0.420 and +2.860. This can be expressed as a formula $$+0.420 < Y_H < +2.860$$

wherein $Y_H$ is the above mentioned quotient; that is, $Y_H = f_H : f_M$. In connection with this rule, it is pointed out that the paraxial focal length $f_H$ of the inner member H is calculated for this member itself alone, referred to a single passage of the ray through the member, in the medium of air. The focal length $f_M$ is also calculated with reference to passage through the medium air.

Rule 3 or $c$: The quotient of the paraxial refractive power $\Phi_A$ divided by the paraxial reflective power $\phi_M$, which quotient may be either positive or negative, is, if positive, within the range or limits of equal to or greater than 0 and no greater than +0.479, while if this quotient is negative, it is within the range or limits of equal to or less than 0, and not less than −1.129. Thus rule can be expressed by the formula $$+0.479 > Q_A > -1.129$$

wherein $Q_A = \Phi_A : \phi_M$. In calculating this quotient, the paraxial refractive power $\Phi_A$ is calculated for a single passage of the light ray through the front member A, and the paraxial reflective power $\phi_M$ of the mirror is taken as the reciprocal of the paraxial focal length $f_M$ of the mirror or reflecting surface.

Rule 4 or $d$: The negative element or component N of the front member A is so dimensioned with respect to other parts, that the quotient $Y_N$ of the negative focal length $f_N$ of this negative component N, divided by the focal length $f_M$ of the reflecting or mirror layer, has a negative value within the range or limits of 0.137 and 0.614. This may be expressed by the formula $0.137 < -Y_N < 0.614$, or, expressing the same thing slightly differently, $-0.137 > Y_N < -0.614$ wherein $Y_N = f_N : f_M$. It is believed clear from what has been said above that $f$ refers to the focal length of the individual member or part or component indicated by the subscript. It is emphasized that for purposes of these rules of construction herein set forth, the focal length $f$ of the particular member or part under consideration is calculated with reference to this member or part alone, and with respect to only a single passage of the ray through the member or part, and on the assumption that the member or part is in the medium air.

With reference particularly to above Rule 4, it pointed out that the negative component N of the front member A produces an over-correcting effect. The result is obtained that a sufficiently large negative quotient becomes active in forming the image dioptrically and thus also with overcorrection, without impairing the possibilities of fine correction of the aberrations of higher order. At the same time, the negative focal length ($f_N$) assures the attaining of excellent possibility of correction of all other errors with the utilization of the range of the commercial types of glass readily available, without having to turn to extreme or unusual types of glass.

It has also been found advisable, in the development of the present invention, to make the paraxial focal length $f_M$ of the concave mirror reflecting layer, within the range or limits of 1.305 and 3.125 times the equivalent focal length F of the entire optical system or objective. In this way this definite mirror effect can be utilized for establishing of further progress without this proportional collecting action of the concave mirror, in contradistinction to the corresponding action of refracting components, resulting in the production of proportional chromatic aberrations. At the same time, by this strongly collecting mirror, there is obtained a substantial contribution to the reduction and thus to the correction of the Petzval image curvature, as a result of the fact that with mirror surfaces, instead of a positive index of refraction of light-refracting lens surfaces, the index of reflection is $-1$, which is independent of the wavelength.

In addition to this mirror contribution to the correction of image errors, the main correction action is provided, in the new mirror-lens objective of the present invention, by the negative component N, which, in accordance with the present invention, is associated with the outer member A. The rays entering without aberration into the outer member A from the object, upon their entrance into the air space $\alpha$ between the outer member A and the inner member H no longer contain (in distinction to the prior art) a strong undercorrection, but rather have a substantial partial correction effect in the sense of overcorrection. In order to obtain this correction-related goal, and in strict contradistinction to certain teachings of the prior art, the outer member A according to the present invention is dimensioned with only a very small paraxial characteristic diffractive power $\Phi_A$ relative to the paraxial reflective power $\phi_M$ in the manner that the quotient $Q_A$ is within the limits of $+0.479$ and $-1.129$. This has already been mentioned in connection with Rule 3 above, but it is here repeated in connection with the further explanation that when this quotient $Q_A$ has a positive sign, it means that the composite outer member A has a small excess characteristic refractive power $\Phi_A$ of collecting action. On the other hand, a negative sign for this quotient indicates that the outer member A has an excess negative action. From this latter case of dimensioning, it can be directly noted that the dioptric action of the negative element N arranged in the outer member A and which so substantially participates in the main corrective action, has a more strongly negative action than the neighboring lenses associated with it which, together with the negative element N, jointly form the outer member A.

In the simplest form of this forward or outer member A, a simple collecting lens or positive lens is added to the negative element N, so that the member A consisting of a positive element plus the negative element N can be developed as a doublet, preferably but not necessarily cemented. The inner member H can be also be assembled as a doublet, cemented or spaced, if the designer considers this advantageous for any reason, without departing from the invention. Since sufficient space is generally available on the outside (that is, the front) of the system, the outer member A can also be subjected, pursuant to the invention, to further splitting, that is, can be made up of more than merely two elements, as disclosed in detail in some of the specific examples.

It is to be especially noted that, according to the present invention, the negative element N is developed as part of the front member A, rather than as part of the rear member H. In some prior mirror-lens objectives, the above mentioned quotient $Y_N$ may have a value which is within the numerical range indicated by the above Rule 4, but it is emphasized that in the prior systems which do have the quotient within this numerical range, the negative element is, contrary to the present invention, formed as part of the inner member rather than the outer or front member, and thus is closely adjacent the mirror. It is only when the negative element is made part of the front member, and thus spaced a substantial distance forwardly from the mirror, that the technically easily usable path is opened up towards exploiting the extremely advantageous increase in size of the relative aperture for a given field of view and/or the pertinent widening of the angular image field, in accordance with the overall combination of the new dimensioning rules above set forth.

Also it is worthy of emphasis that since the quantities $f_H$ and $f_M$ have identical signs, the quotient values of $Y_H$ always have a positive sign rather than a negative one.

The importance of the above stated rules of design will be readily apparent to the man skilled in the art both with respect to the correction effects and with respect to the purely dioptric events, when it is noted that the excess collecting action necessary to obtain a real image is established in the vicinity of the concave mirror as the position of quasi-symmetry, and thus at a place of small heights of ray passage. On the other hand, the negative element or component N which so substantially contributes to the over-correction effect is associated with the outer member A bordering the conjugates, where this over-correction effect of the negative element N is now distributed over the wide aperture cross sections and beam slopes. At the same time, the rays which enter without aberration into the front surface of the system are already provided, before they enter into the combination of the positive inner member H plus the collecting mirror M, with a partial over-correction effect which particularly reduces aberrations.

Furthermore, it is also included within the scope of use of the present invention that the air space α between the outer member A on the one hand and the inner member H on the other hand may be used as space for the insertion of one or more filters, either color filters or neutral density filters. This is a very desirable location for filters, since at this position of insertion, the diameter of the filters can be kept substantially smaller than when the filters are, in known manner, fastened in the conventional way on the front of the objective. When the filter or filters are inserted in this manner between the front member A and the rear member H, the dimensional saving (as compared with having the filter at the front of the system) becomes greater, the longer such objective lenses are, and the larger their usable angular visual field is made. It is also desired to mention that the filters, according to the present invention, may be used not only in the most frequently employed form of flat plates or parallel plane plates, which have a definite tendency toward disturbing image reflections, but also in the definitely advantageous form of filter disks with curved surfaces. Regardless of the shape of the filter, it must be borne in mind with respect to the transmission factors of such filters, that the rays pass twice through the filters on the way from the object to the image.

As above mentioned, the outer member A contains, in addition to the negative component or element N, a positive component or element, so that in this outer member A there are at least two lens elements of opposite sign power, arranged together at this place. They can be developed, in known manner, as cemented members by properly shaping of their adjacent surfaces. In the interests of particularly easy comparison of the various specific examples given below, the negative element and the adjacent positive element of the front member are, in each of the examples, always indicated as a cemented doublet. This is, however, for the sake of easy comparison, and it is to be realized that the negative element and the adjacent positive element of the front member are not necessarily formed as a cemented doublet. Since the number of lens elements at this place is not of particular importance, it is also within the scope of the invention to split the lens component in front of the negative element into two components, in order to be able to obtain a further refinement of the quality of the image, particularly if a finite air gap is introduced at this point of splitting, as has also been shown in the examples below.

In this connection, an air lens can be introduced into the place of the split. Depending on the intent of the designer, such air lens can have either the outer shape of a collecting lens, or the outer shape of a diverging lens. A third possibility is also feasible, namely, that the air lens at this point of split may have the shape of a zero lens, and the neighboring surfaces at this place of split may be of identical dimensions both with respect to sign of radius and length of radius, so that the two surfaces may be cemented together if desired, with corresponding reduction of the inner vertex distance, but with the advantage of being able to use different glasses with different indices of refraction, and/or different color dispersion characteristics, in order to obtain a fine dioptric effect at this pair of surfaces.

BRIEF DESCRIPTION OF THE DRAWINGS

FIG. 1 is a schematic diagram illustrating a mirror-lens system in accordance with one embodiment of the invention; and FIGS. 2–9 are similar diagrams illustrating other embodiments of the invention.

Figure 5:
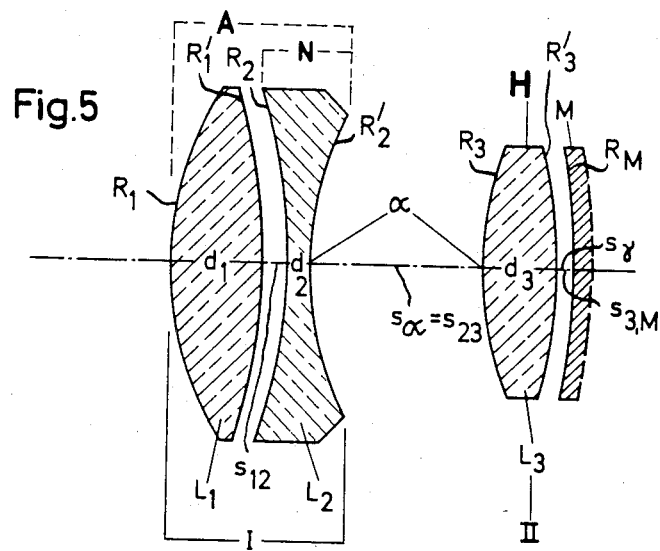

These drawings are not necessarily drawn to scale, and are intended to illustrate the general arrangement of various optical elements according to various specific examples of the invention, rather than illustrating exactly or precisely any one embodiment. Thus each figure of the drawings may serve to illustrate diagrammatically more than one specific example, even though there may be differences in the radii, thicknesses, and spacings of the elements of one example as compared with those of another example illustrated schematically in the same drawing. Also it should be noted that, for the sake of clarity of diagrammatic or schematic illustration, each separate optical element has been shown somewhat spaced from the next adjacent element, notwithstanding that in some cases there is no spacing between elements, as will be apparent from the tabular data in the specific examples. Each table of the specific examples also indicates which view of the drawings illustrates schematically the example whose details are given in that table.

DESCRIPTION OF THE PREFERRED EMBODIMENTS

In the tables of specific examples, all linear dimensions such as radii, thicknesses, and spacings are not intended to refer to absolute dimensions, but rather to proportionate dimensions, in proportion to the equivalent focal length of the mirror-lens system, which is designated as unity. Thus F = 1.000.

Where the spacing in the data tables is indicated as 0 (zero) this indicates that in this specific example, the surfaces are cemented together, even though the drawings may show the surfaces as slightly separated from each other, for clarity of illustration as above explained. Also it is to be noted that the reflecting surface or mirror surface may be supported by the rear surface of the rearmost lens element, as in most of the specific examples, or may be supported by a separate support of its own, as schematically shown for example in FIGS. 2, 3, 7a, and 9, referring to examples 2, 4, 7, 16, and 22.

It will be noted from study of the data tables that the various optical elements, according to the present invention, can be made with relatively long radii of curvature. Accordingly it is possible to have rather small lens thicknesses and air spacings.

The calculations of focal length values have been made with reference to the paraxial ray and the remote object. The ray transfers at the boundaries of individual elements, whether in contact with each other (cemented) or spaced, have been calculated in known manner assuming air as the neighboring medium. By this type of calculation, the effective paraxial characteristic focal lengths are made clearly accessible to a precise numerical determination in agreement with recognized practice. In the tables, as well as in the drawings, the individual lens elements have been numbered consecutively from front to rear; that is, from the combined object side and image side, rearwardly toward the mirror. The mirror reflecting surface has been designated, both in the schematic drawings as in the data tables, as element M. Radii of individual elements are indicated by the letter R with a subscript indicating the number of the individual element, for the radius the front surface of the element, and with a prime plus a subscript number for the rear surface of the element. In accordance with conventional practice, plus signs of radii indicates surfaces convex toward the front, and minus signs of radii indicate surfaces concave toward the front. Thicknesses are indicated by the letter T with a subscript according to the number of the individual element as numbered consecutively from front to rear. Spacings are indicated by the letter S with a subscript the numbers of the elements both in front of and behind the space. Thus for example $S_{12}$ designates the space between elements 1 and 2, $S_{34}$ designates the space between elements 3 and 4, and so on, $S_{4M}$ designating the space between element 4 and the mirror.

The column headed N in the data talbes of the examples gives the index of refraction of the glass used for the respective elements. In those examples intended for monochromatic use, the index of refraction may be the index with respect to the particular wave length intended to be employed, or may be the index of refraction of the glass as listed in commonly available commercial glass catalogues, such as the index with respect to the D-line of sodium. In some examples, where the system is intended for use in a spectral range of finite width, the example tables give also examples which have been achromatized, the color dispersion or Abbe number being given in the column headed V.

The data tables also give, at the top, the relative aperture in the usual form of notation. Also, at the top of the table, the angular extent of the field of view is indicated in the usual way by the letter W. At the bottom of each table, the focal length of the mirror is designated by $f_M$ with relation to the equivalent focal length F of the entire system which, as already explained, is considered unity or 1.000.

Example 1. (FIG. 1)
F = 1.0000   f/8   W = ± 30°

| Element | Radii | | Thicknesses and Spacings | | N |
|---|---|---|---|---|---|
| 1 | $R_1$ | = + 0.3963 | $T_1$ | = 0.09913 | 1.4645 |
|   | $R'_1$ | = − 1.2732 | $S_{12}$ | = 0 | |
| 2 | $R_2$ | = − 1.2732 | $T_2$ | = 0.03163 | 1.6827 |
|   | $R'_2$ | = + 0.5958 | $S_{23}$ | = 0.04177 | |
| 3 | $R_3$ | = + 3.8946 | $T_3$ | = 0.07567 | 1.7283 |
|   | $R'_3$ | = − 1.1351 | $S_{34}$ | = 0.00151 | |
| 4 | $R_4$ | = − 1.1351 | $T_4$ | = 0.04185 | 1.7283 |
|   | $R'_4$ | = − 3.7512 | $S_{4M}$ | = 0 | |
| M | $R_M$ | = − 3.7512 | | | − 1.0 |

Mirror focal length $f_M = + 1.8756\ F$

Example 2. (FIG. 2)
F = 1.0000   f/8   W = ± 31°

| Element | Radii | | Thicknesses and Spacings | | N |
|---|---|---|---|---|---|
| 1 | $R_1$ | = + 0.357 | $T_1$ | = 0.07000 | 1.5170 |
|   | $R'_1$ | = − 1.040 | $S_{12}$ | = 0 | |
| 2 | $R_2$ | = − 1.040 | $T_2$ | = 0.04226 | 1.6826 |
|   | $R'_2$ | = + 0.473 | $S_{23}$ | = 0.06250 | |
| 3 | $R_3$ | = + 3.553 | $T_3$ | = 0.02993 | 1.7400 |
|   | $R'_3$ | = − 4.20796 | $S_{3M}$ | = 0.00442 | |
| M | $R_M$ | = − 4.20922 | | | − 1.0 |

Mirror focal length $f_M = + 2.10461\ F$

Example 3. (FIG. 1)
F = 1.0000   f/8   W = ± 32°

| Element | Radii | | Thicknesses and Spacings | | N |
|---|---|---|---|---|---|
| 1 | $R_1$ | = + 0.3976 | $T_1$ | = 0.1000 | 1.466 |
|   | $R'_1$ | = − 1.2500 | $S_{12}$ | = 0 | |
| 2 | $R_2$ | = − 1.2500 | $T_2$ | = 0.0310 | 1.685 |
|   | $R'_2$ | = + 0.6000 | $S_{23}$ | = 0.0510 | |
| 3 | $R_3$ | = + 3.9000 | $T_3$ | = 0.0760 | 1.729 |
|   | $R'_3$ | = − 1.2500 | $S_{34}$ | = 0.0014 | |
| 4 | $R_4$ | = − 1.2500 | $T_4$ | = 0.0422 | 1.730 |
|   | $R'_4$ | = − 3.75238 | $S_{4M}$ | = 0 | |
| M | $R_M$ | = − 3.75238 | | | − 1.0 |

Mirror focal length $f_M = + 1.87619\ F$

Example 4 (FIG. 3)
F = 1.0000   f/8   W = ± 32°

| Element | Radii | | Thicknesses and Spacings | | N | V |
|---|---|---|---|---|---|---|
| 1 | $R_1$ | = + 0.3804 | $T_1$ | = 0.031330 | 1.65844 | 50.88 |
|   | $R'_1$ | = + 0.3108 | $S_{12}$ | = 0.003666 | | |
| 2 | $R_2$ | = + 0.3052 | $T_2$ | = 0.080326 | 1.51680 | 64.12 |
|   | $R'_2$ | = − 1.7838 | $S_{23}$ | = 0 | | |
| 3 | $R_3$ | = − 1.7838 | $T_3$ | = 0.024442 | 1.65844 | 50.88 |
|   | $R'_3$ | = + 0.5004 | $S_{34}$ | = 0.030775 | | |
| 4 | $R_4$ | = + 2.7362 | $T_4$ | = 0.021554 | 1.51011 | 64.25 |
|   | $R'_4$ | = − 4.0196 | $S_{4M}$ | = 0.023553 | | |
| M | $R_M$ | = − 4.0989486 | | | − 1.0 | |

Mirror focal length $f_M = + 2.0494743\ F$

| Example 5. F = 1.0000 | | (FIG. 4) f/8 W = ± 34° | | |
|---|---|---|---|---|
| Element | Radii | Thicknesses and Spacings | | N |
| 1 | $R_1 = +0.4161$ <br> $R'_1 = +1.1043$ | $T_1 = 0.04815$ <br> $S_{12} = 0.00806$ | | 1.51680 |
| 2 | $R_2 = +0.7730$ <br> $R'_2 = -1.6180$ | $T_2 = 0.04969$ <br> $S_{23} = 0$ | | 1.51680 |
| 3 | $R_3 = -1.6180$ <br> $R'_3 = +0.4541$ | $T_3 = 0.04738$ <br> $S_{34} = 0.03600$ | | 1.65844 |
| 4 | $R_4 = +2.4097$ <br> $R'_4 = -4.25517$ | $T_4 = 0.02098$ <br> $S_{4M} = 0$ | | 1.51011 |
| M | $R_M = -4.25517$ | | | -1.0 |

Mirror focal length $f_M = +2.127584\,F$

| Example 6. F = 1.0000 | | (FIG. 4) f/8 W = ± 36° | | |
|---|---|---|---|---|
| Element | Radii | Thicknesses and Spacings | | N |
| 1 | $R_1 = +0.3639$ <br> $R'_1 = +0.7706$ | $T_1 = 0.05416$ <br> $S_{12} = 0.00605$ | | 1.51680 |
| 2 | $R_2 = +1.1008$ <br> $R'_2 = -1.6256$ | $T_2 = 0.04778$ <br> $S_{23} = 0$ | | 1.51680 |
| 3 | $R_3 = -1.6256$ <br> $R'_3 = +0.50565$ | $T_3 = 0.02587$ <br> $S_{34} = 0.03523$ | | 1.65844 |
| 4 | $R_4 = +1.72774$ <br> $R'_4 = -4.291886$ | $T_4 = 0.02113$ <br> $S_{4M} = 0$ | | 1.51011 |
| M | $R_M = -4.291886$ | | | -1.0 |

Mirror focal length $f_M = +2.145943\,F$

| Example 7. F = 1.0000 | | (FIG. 3) f/8 W = ± 37° | | |
|---|---|---|---|---|
| Element | Radii | Thicknesses and Spacings | | N |
| 1 | $R_1 = +0.380$ <br> $R'_1 = +0.310$ | $T_1 = 0.0320$ <br> $S_{12} = 0.0050$ | | 1.660 |
| 2 | $R_2 = +0.310$ <br> $R'_2 = -1.780$ | $T_2 = 0.0800$ <br> $S_{23} = 0$ | | 1.530 |
| 3 | $R_3 = -1.780$ <br> $R'_3 = +0.510$ | $T_3 = 0.0250$ <br> $S_{34} = 0.0280$ | | 1.660 |
| 4 | $R_4 = +3.800$ <br> $R'_4 = -3.800$ | $T_4 = 0.0215$ <br> $S_{4M} = 0.0240$ | | 1.520 |
| M | $R_M = -4.12390$ | | | -1.0 |

Mirror focal length $f_M = +2.06195\,F$

| Example 8. F = 1.0000 | | (FIG. 5) f/5.6 W = ± 30° | | |
|---|---|---|---|---|
| Element | Radii | Thicknesses and Spacings | | N |
| 1 | $R_1 = +0.500$ <br> $R'_1 = -0.850$ | $T_1 = 0.2300$ <br> $S_{12} = 0$ | | 1.515 |
| 2 | $R_2 = -0.850$ <br> $R'_2 = +0.575$ | $T_2 = 0.0330$ <br> $S_{23} = 0.0230$ | | 1.750 |
| 3 | $R_3 = +1.064$ <br> $R'_3 = -3.41941$ | $T_3 = 0.1250$ <br> $S_{3M} = 0$ | | 1.640 |
| M | $R_M = -3.41941$ | | | -1.0 |

Mirror focal length $f_M = +1.709705\,F$

| Example 9. F = 1.0000 | | (FIG. 5) f/8 W = ± 38° | | |
|---|---|---|---|---|
| Element | Radii | Thicknesses and Spacings | | N |
| 1 | $R_1 = +0.3558$ <br> $R'_1 = -1.0470$ | $T_1 = 0.06885$ <br> $S_{12} = 0$ | | 1.51680 |
| 2 | $R_2 = -1.0470$ <br> $R'_2 = +0.4603$ | $T_2 = 0.04520$ <br> $S_{23} = 0.05788$ | | 1.67003 |
| 3 | $R_3 = +2.9154$ <br> $R'_3 = -4.18618$ | $T_3 = 0.03402$ <br> $S_{3M} = 0$ | | 1.64769 |
| M | $R_M = -4.18618$ | | | -1.0 |

Mirror focal length $f_M = +2.09309\,F$

| Example 10. F = 1.0000 | | (FIG. 5) f/8 W = ± 39° | | | |
|---|---|---|---|---|---|
| Element | Radii | Thicknesses and Spacings | | N | V |
| 1 | $R_1 = +0.38056$ <br> $R'_1 = -1.62789$ | $T_1 = 0.098804$ <br> $S_{12} = 0$ | | 1.51680 | 64.12 |
| 2 | $R_2 = -1.62789$ <br> $R'_2 = +0.46537$ | $T_2 = 0.046359$ <br> $S_{23} = 0.035848$ | | 1.65844 | 50.88 |
| 3 | $R_3 = +1.95074$ <br> $R'_3 = -4.29537$ | $T_3 = 0.021133$ <br> $S_{3M} = 0$ | | 1.51011 | 64.25 |
| M | $R_M = -4.29537$ | | | -1.0 | |

Mirror focal length $f_M = +2.147685\,F$

| Example 11. F = 1.0000 | | (FIG. 5) f/8 W = ± 42.5° | | | |
|---|---|---|---|---|---|
| Element | Radii | Thicknesses and Spacings | | N | V |
| 1 | $R_1 = +0.39653$ <br> $R'_1 = -1.27384$ | $T_1 = 0.099182$ <br> $S_{12} = 0$ | | 1.46450 | 65.70 |
| 2 | $R_2 = -1.27384$ <br> $R'_2 = +0.59615$ | $T_2 = 0.031647$ <br> $S_{23} = 0.041793$ | | 1.68273 | 44.51 |

-Continued

Example 11.
F = 1.0000  f/8  (FIG. 5) W = ± 42.5°

| Element | Radii | | Thicknesses and Spacings | | N | V |
|---|---|---|---|---|---|---|
| 3 | $R_3$ | = + 3.89656 | $T_3$ | = 0.119927 | 1.72825 | 28.41 |
|   | $R'_3$ | = − 3.75316 | $S_{3M}$ | = 0 | | |
| M | $R_M$ | = − 3.75316 | | | −1.0 | |

Mirror focal length $f_M$ = + 1.876580 F

Example 12.
F = 1.0000  f/5.6  (FIG. 5) W = ± 37°

| Element | Radii | | Thicknesses and Spacings | | N | V |
|---|---|---|---|---|---|---|
| 1 | $R_1$ | = + 0.44646 | $T_1$ | = 0.151004 | 1.51680 | 64.12 |
|   | $R'_1$ | = − 0.94801 | $S_{12}$ | = 0 | | |
| 2 | $R_2$ | = − 0.94801 | $T_2$ | = 0.031920 | 1.74400 | 44.77 |
|   | $R'_2$ | = + 0.61707 | $S_{23}$ | = 0.045201 | | |
| 3 | $R_3$ | = + 1.98200 | $T_3$ | = 0.068861 | 1.64769 | 33.86 |
|   | $R'_3$ | = − 3.614943 | $S_{3M}$ | = 0 | | |
| M | $R_M$ | = − 3.614943 | | | − 1.0 | |

Mirror focal length $f_M$ = 1.8074717 F

Example 13.
F = 1.0000  f/4.7  (FIG. 5) W = ± 37°

| Element | Radii | | Thicknesses and Spacings | | N | V |
|---|---|---|---|---|---|---|
| 1 | $R_1$ | = + 0.51288 | $T_1$ | = 0.231471 | 1.51680 | 64.12 |
|   | $R'_1$ | = − 0.96967 | $S_{12}$ | = 0 | | |
| 2 | $R_2$ | = − 0.96967 | $T_2$ | = 0.032701 | 1.74400 | 44.77 |
|   | $R'_2$ | = + 0.76713 | $S_{23}$ | = 0.059598 | | |
| 3 | $R_3$ | = + 2.29694 | $T_3$ | = 0.109039 | 1.64769 | 33.86 |
|   | $R'_3$ | = − 3.574416 | $S_{3M}$ | = 0 | | |
| M | $R_M$ | = − 3.574416 | | | − 1.0 | |

Mirror focal length $f_M$ = + 1.787208 F

Example 14.
F = 1.0000  f/4.5  (FIG. 5) W = ± 37.5°

| Element | Radii | | Thicknesses and Spacings | | N | V |
|---|---|---|---|---|---|---|
| 1 | $R_1$ | = + 0.48949 | $T_1$ | = 0.234049 | 1.51680 | 64.12 |
|   | $R'_1$ | = − 0.84125 | $S_{12}$ | = 0 | | |
| 2 | $R_2$ | = − 0.84125 | $T_2$ | = 0.023662 | 1.74400 | 44.77 |
|   | $R'_2$ | = + 0.58051 | $S_{23}$ | = 0.028014 | | |
| 3 | $R_3$ | = + 1.12270 | $T_3$ | = 0.100785 | 1.60342 | 38.02 |
|   | $R'_3$ | = − 3.345656 | $S_{3M}$ | = 0 | | |
| M | $R_M$ | = − 3.345656 | | | − 1.0 | |

Mirror focal length $f_M$ = + 1.672828 F

Figure 6:
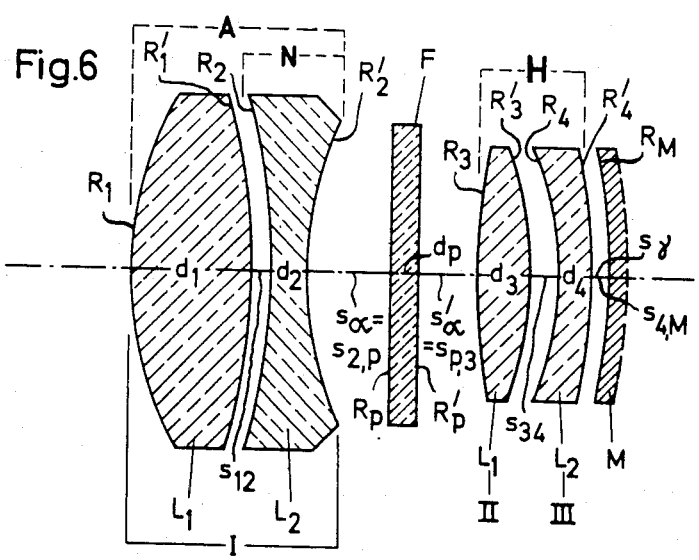

Example 15.
F = 1.0000  f/8  (FIG. 6) W = ± 30°

| Element | Radii | | Thicknesses and Spacings | | N | V |
|---|---|---|---|---|---|---|
| 1 | $R_1$ | = + 0.3963 | $T_1$ | = 0.09913 | 1.46450 | 65.70 |
|   | $R'_1$ | = − 1.2732 | $S_{12}$ | = 0 | | |
| 2 | $R_2$ | = − 1.2732 | $T_2$ | = 0.03163 | 1.68273 | 44.51 |
|   | $R'_2$ | = + 0.5958 | $S_{2P}$ | = 0.02270 | | |

—Continued

Example 15. (FIG. 6)
F = 1.0000    f/8    W = ± 30°

| Element | Radii | | Thicknesses and Spacings | | N | V |
|---|---|---|---|---|---|---|
| Filter | $R_P$ | = plane | $T_p$ | = 0.01513 | 1.51680 | 64.12 |
| | $R'_P$ | = plane | $S_{P3}$ | = 0.00908 | | |
| 3 | $R_3$ | = + 3.8946 | $T_3$ | = 0.07567 | 1.72825 | 28.41 |
| | $R'_3$ | = − 1.1351 | $S_{34}$ | = 0.00151 | | |
| 4 | $R_4$ | = − 1.1351 | $T_4$ | = 0.04185 | 1.72825 | 28.41 |
| | $R'_4$ | = − 3.7512 | $S_{4M}$ | = 0 | | |
| M | $R_M$ | = − 3.7512 | | | − 1.0 | |

Mirror focal length $f_M$ = + 1.8756 F

Example 16. (FIG. 7a)
F = 1.0000    f/8    W = ± 31°

| Element | Radii | | Thicknesses and Spacings | | N |
|---|---|---|---|---|---|
| 1 | $R_1$ | = + 0.3570 | $T_1$ | = 0.07000 | 1.5170 |
| | $R'_1$ | = − 1.0400 | $S_{12}$ | = 0 | |
| 2 | $R_2$ | = − 1.0400 | $T_2$ | = 0.04226 | 1.6826 |
| | $R'_2$ | = + 0.4730 | $S_{2Fi}$ | = 0.01500 | |
| | $R_{Fi}$ | = + 5.3300 | | | |
| Filter | | | $T_{Fi}$ | = 0.02250 | 1.5168 |
| | $R'_{Fi}$ | = + 5.3219 | $S_{Fi3}$ | = 0.03270 | |
| 3 | $R_3$ | = + 3.5530 | $T_3$ | = 0.02993 | 1.7400 |
| | $R'_3$ | = − 4.2080 | $S_{3M}$ | = 0.00442 | |
| M | $R_M$ | = − 4.2092 | | | − 1.0 |

Mirror focal length of $f_M$ = + 2.1046 F

Figure 7A:
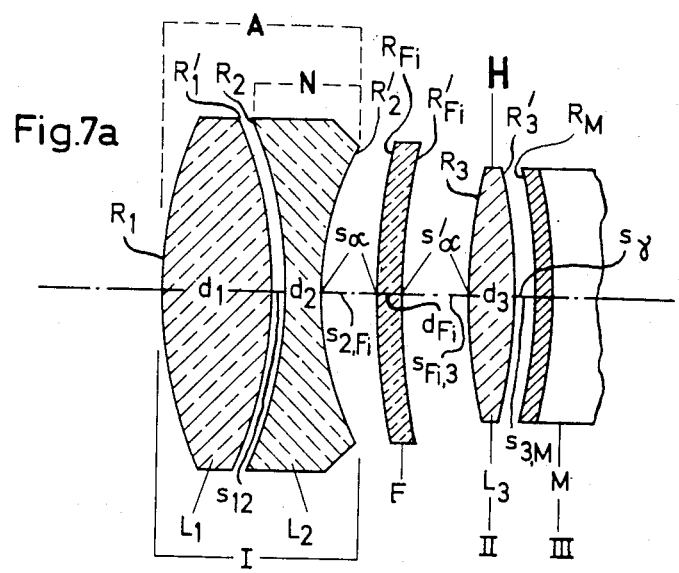
Figure 7B:
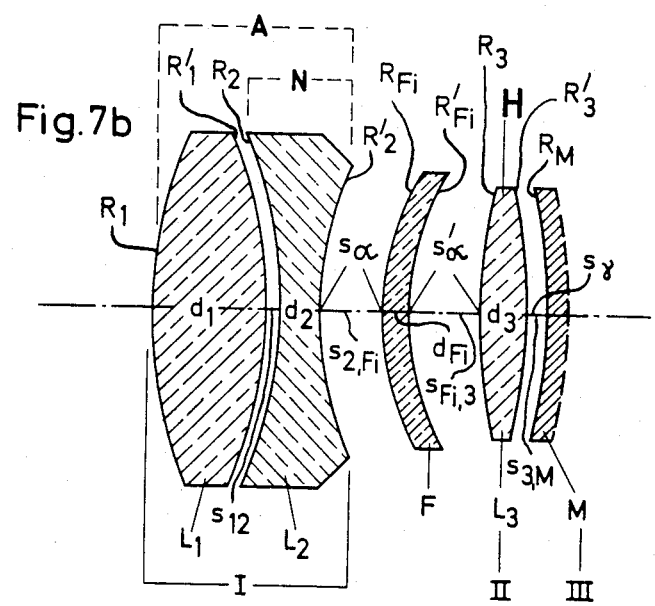

Example 17. (FIG. 7b)
F = 1.0000    f/8    W = ± 38.5°

| Element | Radii | | Thicknesses and Spacings | | N | V |
|---|---|---|---|---|---|---|
| 1 | $R_1$ | = + 0.3718 | $T_1$ | = 0.07379 | 1.51680 | 64.12 |
| | $R'_1$ | = − 3.1316 | $S_{12}$ | = 0 | | |
| 2 | $R_2$ | = − 3.1316 | $T_2$ | = 0.03462 | 1.68273 | 44.51 |
| | $R'_2$ | = + 0.5064 | $S_{2F}$ | = 0.07424 | | |
| | $R_F$ | = + 0.4124 | | | | |
| Filter | | | $T_F$ | = 0.01620 | 1.51680 | 64.12 |
| | $R'_F$ | = + 0.4073 | $S_{F3}$ | = 0.00985 | | |
| 3 | $R_3$ | = + 5.62726 | $T_3$ | = 0.01811 | 1.74000 | 28.20 |
| | $R'_3$ | = − 4.63614 | $S_{3M}$ | = 0 | | |
| M | $R_M$ | = − 4.63614 | | | − 1.0 | |

Mirror focal length $f_M$ = + 2.31807 F

Figure 8:
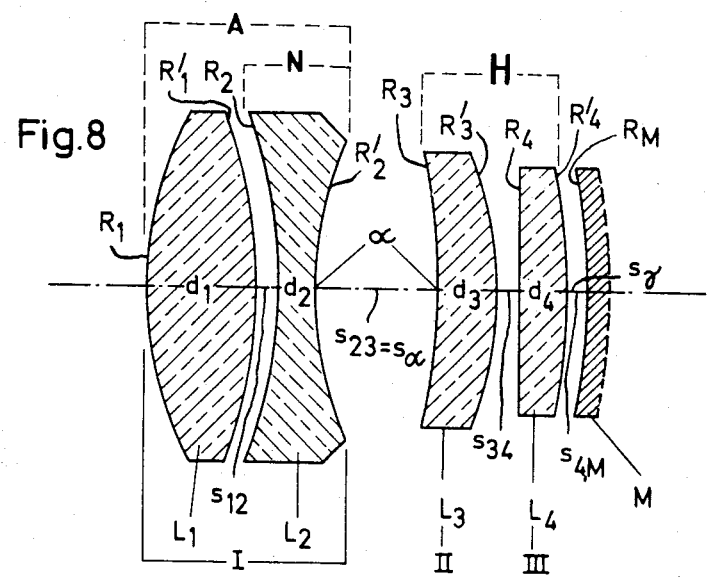
Figure 9:
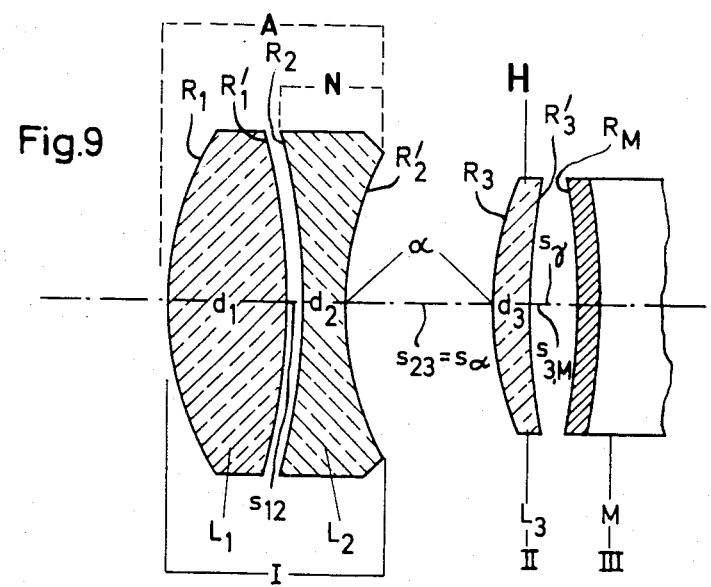

Example 18. (FIG. 8)
F = 1.0000    f/8    W = ± 30°

| Element | Radii | | Thicknesses and Spacings | | N | V |
|---|---|---|---|---|---|---|
| 1 | $R_1$ | = + 0.41265 | $T_1$ | = 0.12352 | 1.46450 | 65.70 |
| | $R'_1$ | = − 0.89548 | $S_{12}$ | = 0 | | |
| 2 | $R_2$ | = − 0.89548 | $T_2$ | = 0.06632 | 1.68273 | 44.51 |
| | $R'_2$ | = + 0.59736 | $S_{23}$ | = 0.03455 | | |
| 3 | $R_3$ | = − 1.13459 | $T_3$ | = 0.06714 | 1.71700 | 47.99 |
| | $R'_3$ | = − 0.84175 | $S_{34}$ | = 0.00039 | | |
| 4 | $R_4$ | = + 12.6127 | $T_4$ | = 0.03622 | 1.72825 | 28.41 |
| | $R'_4$ | = − 4.03223 | $S_{4M}$ | = 0 | | |
| M | $R_M$ | = − 4.03223 | | | − 1.0 | |

Mirror focal length $f_M$ = + 2.016115 F

Example 19. (FIG. 5)
F = 1.0000    f/4.5    W = ± 30°

| Element | Radii | | Thicknesses and Spacings | | N |
|---|---|---|---|---|---|
| 1 | $R_1$ | = + 0.36218 | $T_1$ | = 0.23274 | 1.51680 |
| | $R'_1$ | = − 0.61885 | $S_{12}$ | = 0 | |
| 2 | $R_2$ | = − 0.61885 | $T_2$ | = 0.02900 | 1.74400 |
| | $R'_2$ | = + 0.37571 | $S_{23}$ | = 0.05550 | |
| 3 | $R_3$ | = + 0.69284 | $T_3$ | = 0.07975 | 1.61602 |
| | $R'_3$ | = − 3.80500 | $S_{3M}$ | = 0 | |
| M | $R_M$ | = − 3.80500 | | | − 1.0 |

Mirror focal length $f_M$ = + 1.90250 F

Example 20.
F = 1.0000    f/3.5    (FIG. 5)    W = ±28.5°

| Element | Radii | | Thicknesses and Spacings | | N | V |
|---|---|---|---|---|---|---|
| 1 | $R_1$ | = +0.55189 | $T_1$ | = 0.17308 | 1.51680 | 64.12 |
|   | $R'_1$ | = −0.76097 | $S_{12}$ | = 0 | | |
| 2 | $R_2$ | = −0.76097 | $T_2$ | = 0.17214 | 1.74400 | 44.77 |
|   | $R'_2$ | = +0.64123 | $S_{23}$ | = 0.04977 | | |
| 3 | $R_3$ | = +1.05881 | $T_3$ | = 0.03434 | 1.60565 | 37.83 |
|   | $R'_3$ | = −3.31477 | $S_{3M}$ | = 0 | | |
| M | $R_M$ | = −3.31477 | | | −1.0 | |

Mirror focal length $f_M$ = +1.657385 F

Example 21.
F = 1.0000    f/4.5    (FIG. 5)    W = ±22°

| Element | Radii | | Thicknesses and Spacings | | N | V |
|---|---|---|---|---|---|---|
| 1 | $R_1$ | = +0.71374 | $T_1$ | = 0.57819 | 1.51680 | 64.12 |
|   | $R'_1$ | = −0.81354 | $S_{12}$ | = 0 | | |
| 2 | $R_2$ | = −0.81354 | $T_2$ | = 0.02642 | 1.74400 | 44.77 |
|   | $R'_2$ | = +2.31936 | $S_{23}$ | = 0.04273 | | |
| 3 | $R_3$ | = +12.5000 | $T_3$ | = 0.02602 | 1.62374 | 47.00 |
|   | $R'_3$ | = −2.91744 | $S_{3M}$ | = 0 | | |
| M | $R_M$ | = −2.91744 | | | −1.0 | |

Mirror focal length $f_M$ = +1.45872 F

Example 22.
F = 1.0000    f/3.5    (FIG. 9)    W = ±24°

| Element | Radii | | Thicknesses and Spacings | | N |
|---|---|---|---|---|---|
| 1 | $R_1$ | = +0.34236 | $T_1$ | = 0.10709 | 1.52297 |
|   | $R'_1$ | = −0.98836 | $S_{12}$ | = 0 | |
| 2 | $R_2$ | = −0.98836 | $T_2$ | = 0.02689 | 1.74400 |
|   | $R'_2$ | = +0.34789 | $S_{23}$ | = 0.02756 | |
| 3 | $R_3$ | = +0.53898 | $T_3$ | = 0.03610 | 1.61548 |
|   | $R'_3$ | = +3.63390 | $S_{3M}$ | = 0.02649 | |
| M | $R_M$ | = −3.48344 | | | −1.0 |

Mirror focal length $f_M$ = +1.74172 F

Example 23.
F = 1.0000    f/2.9    (FIG. 2)    W = ±24°

| Element | Radii | | Thicknesses | | N | V |
|---|---|---|---|---|---|---|
| 1 | $R_1$ | = +0.48237 | $T_1$ | = 0.18687 | 1.51680 | 64.12 |
|   | $R'_1$ | = −1.14908 | $S_{12}$ | = 0 | | |
| 2 | $R_2$ | = −1.14908 | $T_2$ | = 0.14231 | 1.74400 | 44.77 |
|   | $R'_2$ | = +0.46184 | $S_{23}$ | = 0.02487 | | |
| 3 | $R_3$ | = +0.65076 | $T_3$ | = 0.04894 | 1.57501 | 41.49 |
|   | $R'_3$ | = −6.88378 | $S_{3M}$ | = 0.03633 | | |
| M | $R_M$ | = −3.18033 | | | −1.0 | |

Mirror focal length $f_M$ = +1.590165 F

Further mirror-lens systems which contain a flat or plane mirror are not to be considered comparable with the mirror-lens system of the present invention, since the plane mirror in no way provides any portion of the total refractive power of the entire system. Also it may be pointed out that whenever the mirror is plane, the system will necessarily have a value of 0 (zero) for the focal length quotient $Y_H$, while the refractive power quotient $Q_A$ will necessarily have the value of infinity.

For the sake of further completeness of the disclosure and to illustrate conveniently that all of the specific examples given above comply fully with all four of the rules set forth above, the following Table I gives for each example, in the respective columns (a) through (d), the respective data called for by the respective rules 1 through 4, designated also as Rules a through d. In the column headed $f_M$ there is shown, for each example, the focal length of the mirror.

The numerical values in Table I have been determined by a seven-place digital electronic computation, and then rounded off to four decimal places.

It may be mentioned, moreover, that in evaluating an optical system of this kind with relation to the limits or ranges which have been set forth above, it is customary to allow a tolerance of plus or minus 5 percent from the figures given as the limits of the range.

TABLE I

| Example | (a) | Feature of the invention (b) | (c) | (d) | $f_M$ |
|---|---|---|---|---|---|
| 1 | + | +1.4040 | −0.0354 | −0.3148 | +1.8756 |
| 2 | + | +1.2390 | 0 | −0.2238 | +2.1046 |
| 3 | + | +1.4078 | −0.0344 | −0.3133 | +1.8762 |
| 4 | + | +1.5589 | +0.1901 | −0.2883 | +2.0495 |
| 5 | + | +1.4191 | +0.1943 | −0.2508 | +2.7276 |
| 6 | + | +1.1267 | −0.0181 | −0.2716 | +2.1459 |
| 7 | + | +1.7738 | +0.2697 | −0.2900 | +2.0620 |
| 8 | + | +0.7498 | −0.4856 | −0.2649 | +1.7097 |
| 9 | + | +1.2701 | +0.0172 | −0.2253 | +2.0931 |
| 10 | + | +1.2259 | +0.0850 | −0.2537 | +2.1477 |
| 11 | + | +1.4082 | −0.0354 | −0.3148 | +1.8766 |
| 12 | + | +1.0988 | −0.1814 | −0.2756 | +1.8075 |
| 13 | + | +1.2169 | +0.0060 | −0.3195 | +1.7872 |
| 14 | + | +0.8399 | −0.3826 | −0.2740 | +1.6728 |
| 15 | + | +1.4060 | −0.0354 | −0.3148 | +1.8756 |
| 16 | + | +1.2408 | 0 | −0.2238 | +2.1046 |
| 17 | + | +1.4974 | +0.2794 | −0.2744 | +2.3181 |
| 18 | + | +1.0249 | −0.1785 | −0.2557 | +2.0161 |
| 19 | + | +0.5035 | −0.7019 | −0.1631 | +1.9025 |
| 20 | + | +0.8018 | −0.4804 | −0.2682 | +1.6574 |
| 21 | + | +2.6014 | +0.4262 | −0.5530 | +1.4587 |
| 22 | + | +0.5877 | −0.9356 | −0.1969 | +1.7417 |
| 23 | + | +0.6518 | −0.6047 | −0.2683 | +1.5902 |

What is claimed is:

1. A multi-lens mirror-lens objective for forming an image on the same side of the objective as the object, at a finite image-forming scale, said objective comprising a collecting mirror (M) at one end of the objective and concave toward the opposite end of the objective, an inner lens member (H) in front of the mirror, and an outer lens member (A) spaced forwardly from the inner lens member, the light rays passing through said inner and outer lens members twice, once when passing inwardly toward said mirror and a second time when passing forwardly after reflection by said mirror, said mirror, inner lens member, and outer lens member being so formed and dimensioned that
   a. the inner lens member has a collecting action and the sign of the focal length of the inner lens member is positive;
   b. the quotient of the paraxial focal length ($f_H$) of the inner lens member (H) divided by the paraxial focal length ($f_M$) of the mirror (M) is within the range limits of + 0.420 and + 2.860, both of such focal lengths being calculated with respect to a single ray passage through the medium of air;
   c. the quotient of the paraxial refractive power ($\Phi_A$) of the outer lens member (A) divided by the paraxial reflective power ($\phi_M$) of the mirror (M) is within the range limits of + 0.479 and − 1.129, the power $\Phi_A$ being calculated with respect to a single ray passage and the paraxial reflective power $\phi_M$ being taken as the reciprocal of the paraxial focal length ($f_M$) of the mirror; and
   d. the outer lens member (A) contains a negative component (N) which gives an over-correcting action, and the quotient of the negative focal length ($f_N$) of the negative component (N) divided by the focal length ($f_M$) of the mirror has a negative value within the range limits of − 0.137 and − 0.614.

2. A mirror-lens objective as defined in claim 1, wherein the rearmost surface of said inner lens member (H) is concave toward the front and constitutes the supporting surface for the mirror (M).

3. A mirror-lens objective as defined in claim 1, whose dimensions and other characteristics are substantially as indicated in the following table, wherein all linear dimensions are expressed in proportion to the equivalent focal length of the entire objective, which is considered as unity (F = 1.0000), and the reference letters and numerals have the respective meanings explained in the foregoing specification:

| Element | | Radii | | Thicknesses and Spacings | N |
|---|---|---|---|---|---|
| 1 | $R_1$ | = + 0.3963 | $T_1$ | = 0.09913 | 1.4645 |
| | $R'_1$ | = − 1.2732 | $S_{12}$ | = 0 | |
| 2 | $R_2$ | = − 1.2732 | $T_2$ | = 0.03163 | 1.6827 |
| | $R'_2$ | = + 0.5958 | $S_{23}$ | = 0.4177 | |
| 3 | $R_3$ | = + 3.8946 | $T_3$ | = 0.07567 | 1.7283 |
| | $R'_3$ | = − 1.1351 | $S_{34}$ | = 0.00151 | |
| 4 | $R_4$ | = − 1.1351 | $T_4$ | = 0.04185 | 1.7283 |
| | $R'_4$ | = − 3.7512 | $S_{4M}$ | = 0 | |
| M | $R_M$ | = − 3.7512 | | | − 1.0 |

4. A mirror-lens objective as defined in claim 1, whose dimensions and other characteristics are substantially as indicated in the following table, wherein all linear dimensions are expressed in proportion to the equivalent focal length of the entire objective, which is considered as unity (F = 1.0000), and the reference letters and numerals have the respective meanings explained in the foregoing specification:

| Element | | Radii | | Thicknesses and Spacings | N |
|---|---|---|---|---|---|
| 1 | $R_1$ | = + 0.357 | $T_1$ | = 0.07000 | 1.5170 |
| | $R'_1$ | = − 1.040 | $S_{12}$ | = 0 | |
| 2 | $R_2$ | = − 1.040 | $T_2$ | = 0.04226 | 1.6826 |
| | $R'_2$ | = + 0.473 | $S_{23}$ | = 0.06250 | |
| 3 | $R_3$ | = + 3.553 | $T_3$ | = 0.02993 | 1.7400 |
| | $R'_3$ | = − 4.20796 | $S_{3M}$ | = 0.00442 | |
| M | $R_M$ | = − 4.20922 | | | − 1.0 |

5. A mirror-lens objective as defined in claim 1, whose dimensions and other characteristics are substantially as indicated in the following table, wherein all linear dimensions are expressed in proportion to the equivalent focal length of the entire objective, which is considered as unity (F = 1.0000), and the reference letters and numerals have the respective meanings explained in the foregoing specification:

| Element | | Radii | | Thicknesses and Spacings | N |
|---|---|---|---|---|---|
| 1 | $R_1$ | = + 0.3976 | $T_1$ | = 0.1000 | 1.466 |
| | $R'_1$ | = − 1.2500 | $S_{12}$ | = 0 | |
| 2 | $R_2$ | = − 1.2500 | $T_2$ | = 0.0310 | 1.685 |
| | $R'_2$ | = + 0.6000 | $S_{23}$ | = 0.0510 | |

-Continued

| Element | Radii | | Thicknesses and Spacings | | N |
|---|---|---|---|---|---|
| 3 | $R_3$ | $= +3.9000$ | $T_3$ | $= 0.0760$ | 1.729 |
|  | $R'_3$ | $= -1.2500$ | $S_{34}$ | $= 0.0014$ |  |
| 4 | $R_4$ | $= -1.2500$ | $T_4$ | $= 0.0422$ | 1.730 |
|  | $R'_4$ | $= -3.75238$ | $S_{4M}$ | $= 0$ |  |
| M | $R_M$ | $= -3.75238$ |  |  | $-1.0$ |

6. A mirror-lens objective as defined in claim 1, whose dimensions and other characteristics are substantially as indicated in the following table, wherein all linear dimensions are expressed in proportion to the equivalent focal length of the entire objective, which is considered as unity ($F = 1.0000$), and the reference letters and numerals have the respective meanings explained in the foregoing specification:

| Element | Radii | | Thicknesses and Spacings | | N | V |
|---|---|---|---|---|---|---|
| 1 | $R_1$ | $= +0.3804$ | $T_1$ | $= 0.031330$ | 1.65844 | 50.88 |
|  | $R'_1$ | $= +0.3108$ | $S_{12}$ | $= 0.003666$ |  |  |
| 2 | $R_2$ | $= +0.3052$ | $T_2$ | $= 0.080326$ | 1.51680 | 64.12 |
|  | $R'_2$ | $= -1.7838$ | $S_{23}$ | $= 0$ |  |  |
| 3 | $R_3$ | $= -1.7838$ | $T_3$ | $= 0.024442$ | 1.65844 | 50.88 |
|  | $R'_3$ | $= +0.5004$ | $S_{34}$ | $= 0.030775$ |  |  |
| 4 | $R_4$ | $= +2.7362$ | $T_4$ | $= 0.021554$ | 1.51011 | 64.25 |
|  | $R'_4$ | $= -4.0196$ | $S_{4M}$ | $= 0.023553$ |  |  |
| M | $R_M$ | $= -4.0989486$ |  |  |  | $-10$ |

7. A mirror-lens objective as defined in claim 1, whose dimensions and other characteristics are substantially as indicated in the following table, wherein all linear dimensions are expressed in proportion to the equivalent focal length of the entire objective, which is considered as unity ($F = 1.0000$), and the reference letters and numerals have the respective meanings explained in the foregoing specification:

| Element | Radii | | Thicknesses and Spacings | | N |
|---|---|---|---|---|---|
| 1 | $R_1$ | $= +0.4161$ | $T_1$ | $= 0.04815$ | 1.51680 |
|  | $R'_1$ | $= +1.1043$ | $S_{12}$ | $= 0.00806$ |  |
| 2 | $R_2$ | $= +0.7730$ | $T_2$ | $= 0.04969$ | 1.51680 |
|  | $R'_2$ | $= -1.6180$ | $S_{23}$ | $= 0$ |  |
| 3 | $R_3$ | $= -1.6180$ | $T_3$ | $= 0.04738$ | 1.65844 |
|  | $R'_3$ | $= +0.4541$ | $S_{34}$ | $= 0.03600$ |  |
| 4 | $R_4$ | $= +2.4097$ | $T_4$ | $= 0.02098$ | 1.51011 |
|  | $R'_4$ | $= -4.25517$ | $S_{4M}$ | $= 0$ |  |
| M | $R_M$ | $= -4.25517$ |  |  | $-1.0$ |

8. A mirror-lens objective as defined in claim 1, whose dimensions and other characteristics are substantially as indicated in the following table, wherein all linear dimensions are expressed in proportion to the equivalent focal length of the entire objective, which is considered as unity ($F = 1.0000$), and the reference letters and numerals have the respective meanings explained in the foregoing specification:

| Element | Radii | | Thicknesses and Spacings | | N |
|---|---|---|---|---|---|
| 1 | $R_1$ | $= +0.3639$ | $T_1$ | $= 0.05416$ | 1.51680 |
|  | $R'_1$ | $= +0.7706$ | $S_{12}$ | $= 0.00605$ |  |
| 2 | $R_2$ | $= +1.1008$ | $T_2$ | $= 0.04778$ | 1.51680 |
|  | $R'_2$ | $= -1.6256$ | $S_{23}$ | $= 0$ |  |
| 3 | $R_3$ | $= -1.6256$ | $T_3$ | $= 0.02587$ | 1.65844 |
|  | $R'_3$ | $= +0.50565$ | $S_{34}$ | $= 0.03523$ |  |
| 4 | $R_4$ | $= +1.72774$ | $T_4$ | $= 0.02113$ | 1.51011 |
|  | $R'_4$ | $= -4.291886$ | $S_{4M}$ | $= 0$ |  |
| M | $R_M$ | $= -4.291886$ |  |  | $-1.0$ |

9. A mirror-lens objective as defined in claim 1, whose dimensions and other characteristics are substantially as indicated in the following table, wherein all linear dimensions are expressed in proportion to the equivalent focal length of the entire objective, which is considered as unity ($F = 1.0000$), and the reference letters and numerals have the respective meanings explained in the foregoing specification:

| Element | Radii | | Thicknesses and Spacings | | N |
|---|---|---|---|---|---|
| 1 | $R_1$ | $= +0.380$ | $T_1$ | $= 0.0320$ | 1.660 |
|  | $R'_1$ | $= +0.310$ | $S_{12}$ | $= 0.0050$ |  |
| 2 | $R_2$ | $= +0.310$ | $T_2$ | $= 0.0800$ | 1.530 |
|  | $R'_2$ | $= -1.780$ | $S_{23}$ | $= 0$ |  |
| 3 | $R_3$ | $= -1.780$ | $T_3$ | $= 0.0250$ | 1.660 |
|  | $R'_3$ | $= +0.510$ | $S_{34}$ | $= 0.0280$ |  |
| 4 | $R_4$ | $= +3.800$ | $T_4$ | $= 0.0215$ | 1.520 |
|  | $R'_4$ | $= -3.800$ | $S_{4M}$ | $= 0.0240$ |  |
| M | $R_M$ | $= -4.12390$ |  |  | $-1.0$ |

10. A mirror-lens objective as defined in claim 1, whose dimensions and other characteristics are substantially as indicated in the following table, wherein all linear dimensions are expressed in proportion to the equivalent focal length of the entire objective, which is considered as unity ($F = 1.0000$), and the reference letters and numerals have the respective meanings explained in the foregoing specification:

| Element | Radii | | Thicknesses and Spacings | | N |
|---|---|---|---|---|---|
| 1 | $R_1$ | $= +0.500$ | $T_1$ | $= 0.2300$ | 1.515 |
|  | $R'_1$ | $= -0.850$ | $S_{12}$ | $= 0$ |  |
| 2 | $R_2$ | $= -0.850$ | $T_2$ | $= 0.0330$ | 1.750 |
|  | $R'_2$ | $= +0.575$ | $S_{23}$ | $= 0.0230$ |  |
|  | $R_3$ | $= +1.064$ |  |  |  |

-Continued

| Element | | Radii | Thicknesses and Spacings | | N |
|---|---|---|---|---|---|
| 3 | $R'_3$ | $= -3.41941$ | $T_3$ | $= 0.1250$ | 1.640 |
| | | | $S_{3M}$ | $= 0$ | |
| M | $R_M$ | $= -3.41941$ | | | $-1.0$ |

11. A mirror-lens objective as defined in claim 1, whose dimensions and other characteristics are substantially as indicated in the following table, wherein all linear dimensions are expressed in proportion to the equivalent focal length of the entire objective, which is considered as unity (F = 1.0000), and the reference letters and numerals have the respective meanings explained in the foregoing specification:

| Element | | Radii | Thicknesses and Spacings | | N |
|---|---|---|---|---|---|
| 1 | $R_1$ | $= +0.3558$ | $T_1$ | $= 0.06885$ | 1.51680 |
| | $R'_1$ | $= -1.0470$ | $S_{12}$ | $= 0$ | |
| 2 | $R_2$ | $= -1.0470$ | $T_2$ | $= 0.04520$ | 1.67003 |
| | $R'_2$ | $= +0.4603$ | $S_{23}$ | $= 0.05788$ | |
| 3 | $R_3$ | $= +2.9154$ | $T_3$ | $= 0.03402$ | 1.64769 |
| | $R'_3$ | $= -4.18618$ | $S_{3M}$ | $= 0$ | |
| M | $R_M$ | $= -4.18618$ | | | $-1.0$ |

12. A mirror-lens objective as defined in claim 1, whose dimensions and other characteristics are substantially as indicated in the following table, wherein all linear dimensions are expressed in proportion to the equivalent focal length of the entire objective, which is considered as unity (F = 1.0000), and the reference letters and numerals have the respective meanings explained in the foregoing specification:

| Element | | Radii | Thicknesses and Spacings | | N | V |
|---|---|---|---|---|---|---|
| 1 | $R_1$ | $= +0.38056$ | $T_1$ | $= 0.98804$ | 1.51680 | 64.12 |
| | $R'_1$ | $= -1.62789$ | $S_{12}$ | $= 0$ | | |
| 2 | $R_2$ | $= -1.62789$ | $T_2$ | $= 0.046359$ | 1.65844 | 50.88 |
| | $R'_2$ | $= +0.46537$ | $S_{23}$ | $= 0.035848$ | | |
| 3 | $R_3$ | $= +1.95074$ | $T_3$ | $= 0.021133$ | 1.51011 | 64.25 |
| | $R'_3$ | $= -4.29537$ | $S_{3M}$ | $= 0$ | | |
| M | $R_M$ | $= -4.29537$ | | | $-1.0$ | |

13. A mirror-lens objective as defined in claim 1, whose dimensions and other characteristics are substantially as indicated in the following table, wherein all linear dimensions are expressed in proportion to the equivalent focal length of the entire objective, which is considered as unity (F = 1.0000), and the reference letters and numerals have the respective meanings explained in the foregoing specification:

| Element | | Radii | Thicknesses and Spacings | | N | V |
|---|---|---|---|---|---|---|
| 1 | $R_1$ | $= +0.39653$ | $T_1$ | $= 0.099182$ | 1.46450 | 65.70 |
| | $R'_1$ | $= -1.27384$ | $S_{12}$ | $= 0$ | | |
| 2 | $R_2$ | $= -1.27384$ | $T_2$ | $= 0.031647$ | 1.68273 | 44.51 |
| | $R'_2$ | $= +0.59615$ | $S_{23}$ | $= 0.041793$ | | |
| 3 | $R_3$ | $= +3.89656$ | $T_3$ | $= 0.119927$ | 1.72825 | 28.41 |
| | $R'_3$ | $= -3.75316$ | $S_{3M}$ | $= 0$ | | |
| M | $R_M$ | $= -3.75316$ | | | $-1.0$ | |

14. A mirror-lens objective as defined in claim 1, whose dimensions and other characteristics are substantially as indicated in the following table, wherein all linear dimensions are expressed in proportion to the equivalent focal length of the entire objective, which is considered as unity (F = 1.0000), and the reference letters and numerals having the respective meanings explained in the foregoing specification:

| Element | | Radii | Thicknesses and Spacings | | N | V |
|---|---|---|---|---|---|---|
| 1 | $R_1$ | $= +0.44646$ | $T_1$ | $= 0.151004$ | 1.51680 | 64.12 |
| | $R'_1$ | $= -0.94801$ | $S_{12}$ | $= 0$ | | |
| 2 | $R_2$ | $= -0.94801$ | $T_2$ | $= 0.031920$ | 1.74400 | 44.77 |
| | $R'_2$ | $= +0.61707$ | $S_{23}$ | $= 0.045201$ | | |
| 3 | $R_3$ | $= +1.98200$ | $T_3$ | $= 0.068861$ | 1.64769 | 33.86 |
| | $R'_3$ | $= -3.614943$ | $S_{3M}$ | $= 0$ | | |
| M | $R_M$ | $= -3.614943$ | | | $-1.0$ | |

15. A mirror-lens objective as defined in claim 1, whose dimensions and other characteristics are substantially as indicated in the following table, wherein all linear dimensions are expressed in proportion to the equivalent focal length of the entire objective, which is considered as unity (F = 1.0000), and the reference letters and numerals have the respective meanings explained in the foregoing specification:

| Element | | Radii | Thicknesses and Spacings | | N | V |
|---|---|---|---|---|---|---|
| 1 | $R_1$ | $= +0.51288$ | $T_1$ | $= 0.231471$ | 1.51680 | 64.12 |
| | $R'_1$ | $= -0.96967$ | $S_{12}$ | $= 0$ | | |
| 2 | $R_2$ | $= -0.96967$ | $T_2$ | $= 0.032701$ | 1.74400 | 44.77 |
| | $R'_2$ | $= +0.76713$ | $S_{23}$ | $= 0.59598$ | | |
| 3 | $R_3$ | $= +2.29694$ | $T_3$ | $= 0.109039$ | 1.64769 | 33.86 |
| | $R'_3$ | $= -3.574416$ | $S_{3M}$ | $= 0$ | | |
| M | $R_M$ | $= -3.574416$ | | | $-1.0$ | |

16. A mirror-lens objective as defined in claim 1, whose dimensions and other characteristics are substantially as indicated in the following table, wherein all linear dimensions are expressed in proportion to the equivalent focal length of the entire objective, which is considered as unity (F = 1.0000), and the reference letters and numerals have the respective meanings explained in the foregoing specification:

| Element | Radii | Thicknesses and Spacings | N | V |
|---|---|---|---|---|
| 1 | $R_1 = +0.48949$ | $T_1 = 0.234049$ | 1.51680 | 64.12 |
|   | $R'_1 = -0.84125$ | $S_{12} = 0$ | | |
| 2 | $R_2 = -0.84125$ | $T_2 = 0.023662$ | 1.74400 | 44.77 |
|   | $R'_2 = +0.58051$ | $S_{23} = 0.028014$ | | |
| 3 | $R_3 = +1.12270$ | $T_3 = 0.100785$ | 1.60342 | 38.02 |
|   | $R'_3 = -3.345656$ | $S_{3M} = 0$ | | |
| M | $R_M = -3.345656$ | | $-1.0$ | |

17. A mirror-lens objective as defined in claim 1, whose dimensions and other characteristics are substantially as indicated in the following table, wherein all linear dimensions are expressed in proportion to the equivalent focal length of the entire objective, which is considered as unity ($F = 1.0000$), and the reference letters and numerals have the respective meanings explained in the foregoing specification:

| Element | Radii | Thicknesses and Spacings | N | V |
|---|---|---|---|---|
| 1 | $R_1 = +0.3963$ | $T_1 = 0.09913$ | 1.46450 | 65.70 |
|   | $R'_1 = -1.2732$ | $S_{12} = 0$ | | |
| 2 | $R_2 = -1.2732$ | $T_2 = 0.03163$ | 1.68273 | 44.51 |
|   | $R'_2 = +0.5958$ | $S_{2P} = 0.02270$ | | |
| Filter | $R_P = $ plane | $T_P = 0.01513$ | 1.51680 | 64.12 |
|   | $R'_P = $ plane | $S_{P3} = 0.00908$ | | |
| 3 | $R_3 = +3.8946$ | $T_3 = 0.07567$ | 1.72825 | 28.41 |
|   | $R'_3 = -1.1351$ | $S_{34} = 0.00151$ | | |
| 4 | $R_4 = -1.1351$ | $T_4 = 0.04185$ | 1.72825 | 28.41 |
|   | $R'_4 = -3.7512$ | $S_{4M} = 0$ | | |
| M | $R_M = -3.7512$ | | $-1.0$ | |

18. A mirror-lens objective as defined in claim 1, whose dimensions and other characteristics are substantially as indicated in the following table, wherein all linear dimensions are expressed in proportion to the equivalent focal length of the entire objective, which is considered as unity ($F = 1.0000$), and the reference letters and numerals have the respective meanings explained in the foregoing specification:

| Element | Radii | Thicknesses and Spacings | N |
|---|---|---|---|
| 1 | $R_1 = +0.3570$ | $T_1 = 0.07000$ | 1.5170 |
|   | $R'_1 = -1.0400$ | $S_{12} = 0$ | |
| 2 | $R_2 = -1.0400$ | $T_2 = 0.04226$ | 1.6826 |
|   | $R'_2 = +0.4730$ | $S_{2Fi} = 0.01500$ | |
| Filter | $R_{Fi} = +5.3300$ | $T_{Fi} = 0.02250$ | 1.5168 |
|   | $R'_{Fi} = +5.3219$ | $S_{Fi3} = 0.03270$ | |
| 3 | $R_3 = +3.5530$ | | |

-Continued

| Element | Radii | Thicknesses and Spacings | N |
|---|---|---|---|
| 3 | $R'_3 = -4.2080$ | $T_3 = 0.02993$ | 1.7400 |
|   |   | $S_{3M} = 0.00442$ | |
| M | $R_M = -4.2092$ | | $-1.0$ |

19. A mirror-lens objective as defined in claim 1, whose dimensions and other characteristics are substantially as indicated in the following table, wherein all linear dimensions are expressed in proportion to the equivalent focal length of the entire objective, which is considered as unity ($F = 1.0000$), and the reference letters and numerals have the respective meanings explained in the foregoing specification:

| Element | Radii | Thicknesses and Spacings | N | V |
|---|---|---|---|---|
| 1 | $R_1 = +0.3718$ | $T_1 = 0.07379$ | 1.51680 | 64.12 |
|   | $R'_1 = -3.1316$ | $S_{12} = 0$ | | |
| 2 | $R_2 = -3.1316$ | $T_2 = 0.03462$ | 1.68273 | 44.51 |
|   | $R'_2 = +0.5064$ | $S_{2F} = 0.07424$ | | |
| Filter | $R_F = +0.4124$ | $T_F = 0.01620$ | 1.51680 | 64.12 |
|   | $R'_F = +0.4073$ | $S_{F3} = 0.00985$ | | |
| 3 | $R_3 = +5.62726$ | $T_3 = 0.01811$ | 1.74000 | 28.20 |
|   | $R'_3 = -4.63614$ | $S_{3M} = 0$ | | |
| M | $R_M = -4.63614$ | | $-1.0$ | |

20. A mirror-lens objective as defined in claim 1, whose dimensions and other characteristics are substantially as indicated in the following table, wherein all linear dimensions are expressed in proportion to the equivalent focal length of the entire objective, which is considered as unity ($F = 1.0000$), and the reference letters and numerals have the respective meanings explained in the foregoing specification:

| Element | Radii | Thicknesses and Spacings | N | V |
|---|---|---|---|---|
| 1 | $R_1 = +0.41265$ | $T_1 = 0.12352$ | 1.46450 | 65.70 |
|   | $R'_1 = -0.89548$ | $S_{12} = 0$ | | |
| 2 | $R_2 = -0.89548$ | $T_2 = 0.06632$ | 1.68273 | 44.51 |
|   | $R'_2 = +0.59736$ | $S_{23} = 0.03455$ | | |
| 3 | $R_3 = -1.13459$ | $T_3 = 0.06714$ | 1.71700 | 47.99 |
|   | $R'_3 = -0.84175$ | $S_{34} = 0.00039$ | | |
| 4 | $R_4 = +12.6127$ | $T_4 = 0.03622$ | 1.72825 | 28.41 |
|   | $R'_4 = -4.03223$ | $S_{4M} = 0$ | | |
| M | $R_M = -4.03223$ | | $-1.0$ | |

21. A mirror-lens objective as defined in claim 1, whose dimensions and other characteristics are substantially as indicated in the following table, wherein all linear dimensions are expressed in proportion to the equivalent focal length of the entire objective, which is considered as unity ($F = 1.0000$), and the reference letters and numerals have the respective meanings explained in the foregoing specification:

| Element | Radii | | Thicknesses and Spacings | | N | V |
|---|---|---|---|---|---|---|
| 1 | $R_1$ | = +0.36218 | $T_1$ | = 0.23274 | 1.51680 | |
|  | $R'_1$ | = −0.61885 | $S_{12}$ | = 0 | | |
| 2 | $R_2$ | = −0.61885 | $T_2$ | = 0.02900 | 1.74400 | |
|  | $R'_2$ | = +0.37571 | $S_{23}$ | = 0.05550 | | |
| 3 | $R_3$ | = +0.69284 | $T_3$ | = 0.07975 | 1.61602 | |
|  | $R'_3$ | = −3.80500 | $S_{3M}$ | = 0 | | |
| M | $R_M$ | = −3.80500 | | | −1.0 | |

22. A mirror-lens objective as defined in claim 1, whose dimensions and other characteristics are substantially as indicated in the following table, wherein all linear dimensions are expressed in proportion to the equivalent focal length of the entire objective, which is considered as unity (F = 1.0000), and the reference letters and numerals have the respective meanings explained in the foregoing specification:

| Element | Radii | | Thicknesses and Spacings | | N | V |
|---|---|---|---|---|---|---|
| 1 | $R_1$ | = 0.55189 | $T_1$ | = 0.17308 | 1.51680 | 64.12 |
|  | $R'_1$ | = −0.76097 | $S_{12}$ | = 0 | | |
| 2 | $R_2$ | = −0.76097 | $T_2$ | = 0.17214 | 1.74400 | 44.77 |
|  | $R'_2$ | = +0.64123 | $S_{23}$ | = 0.04977 | | |
| 3 | $R_3$ | = +1.05881 | $T_3$ | = 0.03434 | 1.60565 | 37.83 |
|  | $R'_3$ | = −3.31477 | $S_{3M}$ | = 0 | | |
| M | $R_M$ | = −3.31477 | | | −1.0 | |

23. A mirror-lens objective as defined in claim 1, whose dimensions and other characteristics are substantially as indicated in the following table, wherein all linear dimensions are expressed in proportion to the equivalent focal length of the entire objective, which is considered as unity (F = 1.0000), and the reference letters and numerals have the respective meanings explained in the foregoing specification:

| Element | Radii | | Thicknesses and Spacings | | N | V |
|---|---|---|---|---|---|---|
| 1 | $R_1$ | = +0.71374 | $T_1$ | = 0.57819 | 1.51680 | 64.12 |
|  | $R'_1$ | = −0.81354 | $S_{12}$ | = 0 | | |
|  | $R_2$ | = −0.81354 | | | | |
| 2 | $R'_2$ | = +2.31936 | $T_2$ | = 0.02642 | 1.74400 | 44.77 |
|  | $R_3$ | = +12.5000 | $S_{23}$ | = 0.04273 | | |
| 3 | $R'_3$ | = −2.91744 | $T_3$ | = 0.02602 | 1.62374 | 47.00 |
|  |  |  | $S_{3M}$ | = 0 | | |
| M | $R_M$ | = −2.91744 | | | −1.0 | |

24. A mirror-lens objective as defined in claim 1, whose dimensions and other characteristics are substantially as indicated in the following table, wherein all linear dimensions are expressed in proportion to the equivalent focal length of the entire objective, which is considered as unity (F = 1.0000), and the reference letters and numerals have the respective meanings explained in the foregoing specification:

| Element | Radii | | Thicknesses and Spacings | | N |
|---|---|---|---|---|---|
| 1 | $R_1$ | = +0.34236 | $T_1$ | = 0.10709 | 1.52297 |
|  | $R'_1$ | = −0.98836 | $S_{12}$ | = 0 | |
| 2 | $R_2$ | = −0.98836 | $T_2$ | = 0.2689 | 1.74400 |
|  | $R'_2$ | = +0.34789 | $S_{23}$ | = 0.02756 | |
| 3 | $R_3$ | = +0.53898 | $T_3$ | = 0.03610 | 1.61548 |
|  | $R'_3$ | = +3.63390 | $S_{3M}$ | = 0.02649 | |
| M | $R_M$ | = −3.48344 | | | −1.0 |

25. A mirror-lens objective as defined in claim 1, whose dimensions and other characteristics are substantially as indicated in the following table, wherein all linear dimensions are expressed in proportion to the equivalent focal length of the entire objective, which is considered as unity (F = 1.0000), and the reference letters and numerals have the respective meanings explained in the foregoing specification:

| Element | Radii | | Thicknesses and Spacings | | N | V |
|---|---|---|---|---|---|---|
| 1 | $R_1$ | = +0.48237 | $T_1$ | = 0.18687 | 1.51680 | 64.12 |
|  | $R'_1$ | = −1.14908 | $S_{12}$ | = 0 | | |
| 2 | $R_2$ | = −1.14908 | $T_2$ | = 0.14231 | 1.74400 | 44.77 |
|  | $R'_2$ | = +0.46184 | $S_{23}$ | = 0.02487 | | |
| 3 | $R_3$ | = +0.65076 | $T_3$ | = 0.04894 | 1.57501 | 41.49 |
|  | $R'_3$ | = −6.88378 | $S_{3M}$ | = 0.03633 | | |
| M | $R_M$ | = −3.18033 | | | −1.0 | |

* * * * *